United States Patent
Liu et al.

(10) Patent No.: US 12,272,824 B2
(45) Date of Patent: Apr. 8, 2025

(54) LITHIUM METAL NEGATIVE ELECTRODE, PREPARATION METHOD THEREFOR, AND RELATED LITHIUM METAL BATTERY AND DEVICE

(71) Applicant: CONTEMPORARY AMPEREX TECHNOLOGY (HONG KONG) LIMITED, Hong Kong (CN)

(72) Inventors: Chengyong Liu, Fujian (CN); Meng Cheng, Fujian (CN); Ang Fu, Fujian (CN); Bobing Hu, Fujian (CN); Yongsheng Guo, Fujian (CN); Quan Fan, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 91 days.

(21) Appl. No.: 18/125,174

(22) Filed: Mar. 23, 2023

(65) Prior Publication Data
US 2023/0223545 A1 Jul. 13, 2023

Related U.S. Application Data

(63) Continuation of application No. PCT/CN2021/128641, filed on Nov. 4, 2021.

(30) Foreign Application Priority Data

Nov. 23, 2020 (CN) .................. 202011320607.X

(51) Int. Cl.
*H01M 4/62* (2006.01)
*H01M 4/04* (2006.01)
(Continued)

(52) U.S. Cl.
CPC ......... *H01M 4/628* (2013.01); *H01M 4/0402* (2013.01); *H01M 4/134* (2013.01);
(Continued)

(58) Field of Classification Search
CPC .... H01M 4/628; H01M 4/622; H01M 4/0402; H01M 4/134; H01M 4/382; H01M 4/405;
(Continued)

(56) References Cited

U.S. PATENT DOCUMENTS

| | | | |
|---|---|---|---|
| 5,824,434 A | 10/1998 | Kawakami et al. | |
| 2007/0180688 A1* | 8/2007 | Kawakami | H01M 4/623 29/623.1 |
| 2008/0020281 A1 | 1/2008 | Kogetsu et al. | |

FOREIGN PATENT DOCUMENTS

| | | |
|---|---|---|
| CN | 106601993 A | 4/2017 |
| CN | 107403910 A | 11/2017 |

(Continued)

OTHER PUBLICATIONS

CN109638255 English translation. Xie et al. China. Apr. 16, 2019 (Year: 2019).*

(Continued)

*Primary Examiner* — Christopher P Domone
(74) *Attorney, Agent, or Firm* — XSENSUS LLP

(57) ABSTRACT

Embodiments of the present application provide a lithium metal negative electrode, a preparation method therefor and related lithium metal battery and device. The lithium metal negative electrode may comprise: a negative electrode current collector; at least one lithium-based metal layer provided on at least one surface of the negative electrode current collector; and an ion-conducting polymer modification layer, which is located on the surface of one of the at least one lithium-based metal layer and comprises at least catalytic amount of a Lewis acid, the Lewis acid containing (Continued)

cations of a metal capable of forming an alloy-type active material with lithium.

21 Claims, 4 Drawing Sheets

(51) Int. Cl.
  *H01M 4/134* (2010.01)
  *H01M 4/1395* (2010.01)
  *H01M 4/38* (2006.01)
  *H01M 10/052* (2010.01)
  *H01M 4/02* (2006.01)

(52) U.S. Cl.
  CPC ......... *H01M 4/1395* (2013.01); *H01M 4/382* (2013.01); *H01M 10/052* (2013.01); *H01M 2004/027* (2013.01)

(58) Field of Classification Search
  CPC ......... H01M 10/052; H01M 2004/027; H01M 10/0565; H01M 2300/0085
  See application file for complete search history.

(56) References Cited

FOREIGN PATENT DOCUMENTS

| | | | |
|---|---|---|---|
| CN | 108232148 | A | 6/2018 |
| CN | 109103517 | A | 12/2018 |
| CN | 109216652 | A | 1/2019 |
| CN | 109346767 | A | 2/2019 |
| CN | 109585947 | A | 4/2019 |
| CN | 109638255 | A | 4/2019 |
| CN | 109841836 | A | 6/2019 |
| CN | 109888381 | A | 6/2019 |
| CN | 109888381 | B | 11/2020 |
| JP | H06-168739 | A | 6/1994 |
| JP | H06-283157 | A | 10/1994 |
| JP | H06-310174 | A | 11/1994 |
| JP | 2005-531585 | A | 10/2005 |
| JP | 2015-173017 | A | 10/2015 |

OTHER PUBLICATIONS

JP2015173017 English translation. Nakajima et al. Japan. Oct. 1, 2015 (Year: 2015).*
CN 109888381 English translation. Wang et al. Jun. 14, 2019. (Year: 2019).*
Office Action issued Jul. 21, 2023 in Indian Patent Application No. 202317017682 (English translation included).
Office Action issued Oct. 16, 2023 in Japanese Patent Application No. 2022-558231.
European Search Report issued Nov. 29, 2023 in European Patent Application No. 21893761.3.
International Search Report and Written Opinion mailed on Dec. 28, 2021, received for PCT Application PCT/CN2021/128641, filed on Nov. 4, 2021, 10 pages including English Translation.
Notice of Allowance issued Jan. 13, 2025 in Korean Patent Application No. 10-2022-7033419 with English translation thereof.

* cited by examiner

LITHIUM METAL NEGATIVE ELECTRODE, PREPARATION METHOD THEREFOR, AND RELATED LITHIUM METAL BATTERY AND DEVICE

CROSS-REFERENCE TO RELATED APPLICATIONS

The present application is a continuation of International Application No. PCT/CN2021/128641, filed Nov. 4, 2021, which claims the priority of Chinese patent application no. 202011320607.X, entitled "Lithium Metal Negative Electrode, Preparation Method Therefor, and Related Lithium Metal Battery and Device" and filed on Nov. 23, 2020, the entire content of each of which is incorporated herein by reference.

TECHNICAL FIELD

The present application relates to the technical field of secondary batteries, and in particular to a lithium metal negative electrode, a preparation method therefor and related lithium metal battery and device.

BACKGROUND ART

Lithium ion batteries have the advantages of high specific energy, long service life, low cost and the like, and thus are widely used. For example, with the increasingly prominent environmental and energy problems, there is an urgent need for the development of new energy electric vehicles and consequently, lithium-ion batteries, as a new type of energy system, have been developed vigorously.

At the same time, people have put forward higher requirements for the cruising range of the electric vehicles. This requires lithium ion batteries as an energy source to have a higher energy density. Lithium metal has an extremely high theoretical specific capacity (3860 mAh/g) and the lowest reduction potential (−3.04V vs standard hydrogen electrode), so the lithium metal negative electrode is expected to become the preferred negative electrode plate for the next generation of high energy density lithium ion batteries.

However, it is found in practical researches that lithium ion batteries (also referred as lithium metal batteries) using lithium metal negative electrode are prone to internal short circuit, which is a great potential safety hazard. Therefore, how to improve the safety performance of lithium metal batteries has become a key challenge in the field of lithium metal batteries.

SUMMARY

In a first aspect, the present application provides a lithium metal negative electrode, comprising: a negative electrode current collector; at least one lithium-based metal layer provided on at least one surface of the negative electrode current collector; and an ion-conducting polymer modification layer, which is located on the surface of at least one lithium-based metal layer and comprises at least catalytic amount of a Lewis acid, and the Lewis acid contains cations of a metal capable of forming an alloy-type active material with lithium.

In the lithium metal negative electrode of the present application, an ion-conducting polymer modification layer is formed on the surface of the lithium-based metal layer under the catalysis of a Lewis acid, and the Lewis acid contains cations of a metal capable of forming an alloy-type active material with lithium. By means of the double effects of the ion-conducting polymer and the alloy, the uniform deposition of lithium on the surface of the lithium metal negative electrode can be effectively adjusted and controlled, and the growth of lithium dendrites can be inhibited, thereby greatly reducing the risk of internal short circuit in the lithium metal batteries and improving the safety performance.

In any embodiment of the present application, the polymer modification layer can have a thickness of 100 nm to 10 µm, optionally 300 nm to 5 µm, further optionally 500 nm to 3 µm. The polymer modification layer has an appropriate thickness, which can effectively improve the safety performance of the battery and improve the cycling performance of the battery. In addition, it is also beneficial for the battery to have a higher energy density.

The inventors found that the safety performance and cycling performance of the battery can be further improved by using suitable Lewis acids and polymers.

In any embodiment of the present application, the Lewis acid can be selected from one or more of the compounds represented by formula (1): $A_nL_m$ (1), in which A represents cations of Al, Zn, Mg, Pb, Ge, Sn or Sb, optionally, A represents cations of Al or Zn; L independently represents $F^-$, $Cl^-$, $Br^-$, $I^-$ or an anion represented by formula (2),

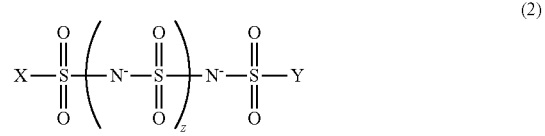

in which each X and Y independently represent F, Cl, Br, or I, an alkyl having 1 to 4 carbon atoms, or a haloalkyl having 1 to 4 carbon atoms, optionally, each X and Y independently represent F or a F-substituted alkyl having 1 to 4 carbon atoms; z is 0, 1, 2, 3 or 4; n and m satisfy: the valence of A×n=the valence of L×m.

In any embodiment of the present application, L may represent $F^-$, $Cl^-$, $Br^-$, $I^-$, $[(FSO_2)_2N]^-$, $[(CF_3SO_2)_2N]^-$, $[(FSO_2)(CF_3SO_2)N]^-$, $[(FSO_2)(C_2F_5SO_2)N]^-$, or $[(FSO_2)(C_4F_9SO_2)N]^-$.

In any embodiment of the present application, the Lewis acid may be selected from one or more of $AlCl_3$, $ZnCl_2$, $Al[(FSO_2)_2N]_3$, and $Zn[(FSO_2)_2N]_2$.

In any embodiment of the present application, the polymer modification layer can have a compressive modulus of elasticity of 0.01 MPa to 1 MPa, optionally 0.02 MPa to 0.78 MPa. The polymer modification layer is flexible and can further improve the interfacial contact between the lithium metal negative electrode and the separator or solid electrolyte membrane (for example, an inorganic solid electrolyte membrane), thereby further improving the deposition/dissolution behavior of lithium, which can further improve the safety performance and cycling performance of the battery.

In any embodiment of the present application, the polymer may include one or more of polyether, polyester and polyimine. Optionally, the polymer includes one or more of polycarbonate, polysulfate, polysulfite and polysulfonate. The use of a suitable polymer allow the modification layer to have an appropriate mechanical strength and flexibility, which can further improve the safety performance of the battery.

In any embodiment of the present application, the polymer modification layer is obtained by means of in-situ polymerization of monomer on the surface of the lithium-based metal layer under the catalysis of the Lewis acid. It is convenient to adjust the thickness of the modification layer within a desired range by means of in-situ polymerization on surface.

In any embodiment of the present application, the monomer may include one or more of cyclic carbonate, cyclic sulfonate, cyclic sulfate, cyclic sulfite and halogenated derivatives thereof. Optionally, the monomer includes one or more of cyclic carbonate and halogenated derivatives thereof.

In any embodiment of the present application, the monomer may include one or more of ethylene carbonate, polypropylene carbonate and halogenated derivatives thereof. Optionally, the monomer includes one or more of ethylene carbonate, and fluoroethylene carbonate. Further optionally, the monomer includes fluoroethylene carbonate. The surface stability of the lithium metal negative electrode can be improved by introducing halogens such as F, thereby further improving the cycling performance of the battery. In addition, a better first-cycle specific discharge capacity and first-cycle charge/discharge efficiency can be further achieved in the battery.

In any embodiment of the present application, the polymer modification layer may also comprise a lithium salt. In some embodiments, the weight percentage of the lithium salt in the polymer modification layer is ≤60%, optionally 10% to 40%. It is beneficial for the battery to have a higher cycling performance by adding a lithium salt in the polymer modification layer.

In any embodiment of the present application, the lithium salt may include one or more of $LiPF_6$, $LiBF_4$, $LiClO_4$, $LiAsF_6$, LiBOB, LiDFOB, LiTFOP, $LiN(SO_2R_F)_2$ and $LiN(SO_2F)(SO_2R_F)$, in which $R_F$ represents $C_nF_{2n+1}$, and n is an integer from 0 to 10. Optionally, the lithium salt includes one or more of $LiN(SO_2F)_2$, LiDFOB and $LiN(SO_2F)(SO_2CF_3)$. A suitable lithium salt allow the modification layer to have a good film-forming effect, thereby further improving the cycling performance of the battery.

In any embodiment of the present application, the polymer modification layer may also comprise an inorganic filler. In some embodiments, the weight percentage of the inorganic filler in the modification layer is ≤10%. Optionally, the weight percentage of the inorganic filler in the modification layer is 1% to 5%. The cycling performance of the battery can be further improved by providing an inorganic filler in the polymer modification layer.

In any embodiment of the present application, the inorganic filler may include one or more of silicon dioxide ($SiO_2$), titanium oxide ($TiO_2$), aluminum oxide ($Al_2O_3$), magnesium oxide (MgO), zirconium oxide ($ZrO_2$), zinc oxide (ZnO), iron oxide ($Fe_3O_4$), barium titanate ($BaTiO_3$), lead titanate ($PbTiO_3$), lithium nitride ($Li_3N$), lithium aluminate ($LiAlO_2$), montmorillonite and molecular sieve.

In any embodiment of the present application, the inorganic filler has a volume-average particle size $D_v50$ of 50 nm to 1000 nm, optionally 100 nm to 800 nm. When the particle size of the inorganic filler is within an appropriate range, the cycling life of the battery can be further improved.

In a second aspect, the present application provides a method for preparing a lithium metal negative electrode, comprising the steps of:

providing a lithium metal negative electrode to be modified comprising a negative electrode current collector and a lithium-based metal layer provided on at least one surface of the negative electrode current collector;

providing a mixed solution comprising a Lewis acid and a monomer, wherein the Lewis acid contains cations of a metal capable of forming an alloy-type active material with lithium;

covering the surface of at least one lithium-based metal layer with the mixed solution, such that an ion-conducting polymer modification layer is formed by means of the polymerization of the monomer under the catalysis of the Lewis acid, so as to obtain the lithium metal negative electrode.

In any embodiment of the present application, the parts by weight of the Lewis acid can be 1 to 35, optionally 3 to 30, further optionally 10 to 20, based on 100 parts by weight of the monomer. The appropriate ratio of the Lewis acid to the monomer allows the modification layer to have a good strength and flexibility, which can effectively inhibit inhibiting the short circuit and improve the safety performance of the battery. In addition, when the ratio of the Lewis acid to the monomer is within an appropriate range, it is also beneficial to improve the cycling life of the battery, and can also allow the battery to have a higher first-cycle specific discharge capacity and first-cycle coulombic efficiency.

In any embodiment of the present application, the mixed solution further comprises a reaction moderator, wherein the parts by weight of the reaction moderator is greater than 0 and less than or equal to 800, optionally 100 to 200, based on 100 parts by weight of the monomer. The reaction moderator can adjust the reaction rate and allow the reaction proceed under a mild condition. The resulting polymer modification layer can be a gelatinous elastic film layer with good quality, which can effectively improve the safety performance and cycling performance of the battery.

In any embodiment of the present application, the reaction moderator may include one or more of dimethyl carbonate, diethyl carbonate, dipropyl carbonate, ethyl methyl carbonate, methyl formate, ethyl formate, ethyl propionate, propyl propionate, methyl butyrate, ethyl acetate, N-methylpyrrolidone, N-methylformamide, N-methylacetamide, acetonitrile, sulfolane, dimethyl sulfoxide, methyl sulfide, diethyl sulfite, dimethyl sulfite, tetrahydrofuran, and cyclic ester as represented by formula (I), optionally one or more of dimethyl carbonate, diethyl carbonate, dipropyl carbonate, and ethyl methyl carbonate;

(I)

in which Q represents O or S, $R^1$ and $R^2$ independently represent H, F, or a fluoroalkyl having 1 to 4 carbon atoms, and $R^3$ represents a fluoroalkylene having 1 to 3 carbon atoms.

In any embodiment of the present application, the mixed solution may also comprise a lithium salt. The content of the lithium salt can be 200 parts by weight or less, based on 100 parts by weight of the monomer. Optionally, the content of the lithium salt is 30 to 80 parts by weight, based on 100 parts by weight of the monomer.

In any embodiment of the present application, the mixed solution may also comprise an inorganic filler. The content of the inorganic filler can be 30 parts by weight or less, based on 100 parts by weight of the monomer. Optionally, the content of the inorganic filler is 10 to 20 parts by weight, based on 100 parts by weight of the monomer.

In a third aspect, the present application provides a lithium metal battery comprising a positive electrode plate and a negative electrode plate, wherein the negative electrode plate is the lithium metal negative electrode provided by the present application. Since the lithium metal negative electrode of the present application is used for the lithium metal battery of the present application, a higher safety performance can be obtained.

In a fourth aspect, the present application provides a device comprising the lithium metal battery according to the third aspect of the present application. The device of the present application comprises the lithium metal battery, and thus has at least the same advantages as the lithium metal battery.

BRIEF DESCRIPTION OF THE DRAWINGS

In order to more clearly illustrate the technical solutions of the embodiments of the present application, the drawings to be used in the description of the embodiments of the present application will be described briefly below. Obviously, the drawings in the following description are merely some embodiments of the present application. For those skilled in the art, other drawings can also be obtained according to these drawings without the inventive labor.

DETAILED DESCRIPTION OF EMBODIMENTS

Figure 1:
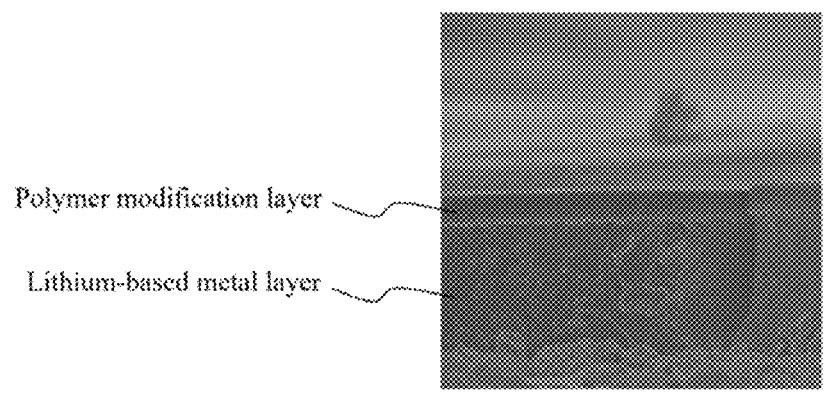
FIG. 1 is a scanning electron microscope (SEM) image of a lithium metal negative electrode provided by an embodiment of the present application.

In order to make the objectives, technical solutions and beneficial technical effects of the present application clearer, the present application will be described in detail below in conjunction with specific embodiments. It is to be understood that the embodiments described in this specification are merely for explaining, instead of, limiting the present application.

For the sake of brevity, merely some numerical ranges are explicitly disclosed herein. However, any lower limit may be combined with any upper limit to form a range that is not explicitly described; and any lower limit may be combined with any other lower limit to form a range that is not explicitly described, and any upper limit may be combined with any other upper limit to form a range that is not explicitly described. Further, although not explicitly specified, each point or single value between endpoints of a range is included in the range. Thus, each point or single value can be taken as a lower or upper limit to be combined with any other point or single value or with any other lower or upper limit to form a range that is not explicitly specified.

In the description herein, it should be noted that, unless otherwise stated, "no less than" and "no more than" means the endpoints preceded by them being included, and "more" in the phrase "one or more" means two or more.

The above summary of the present application is not intended to describe every disclosed embodiment or every implementation of the present application. The following description will illustrate exemplary embodiments in more detail. Throughout the application, teachings are provided by means of a number of embodiments, which can be used in various combinations. In each instance, a list is only a representative group and should not be interpreted as exhaustive.

Firstly, the present application provides a lithium metal negative electrode. The lithium metal negative electrode comprises a negative electrode current collector, a lithium-based metal layer located on at least one surface of the negative electrode current collector, and a polymer modification layer located on the surface of at least one lithium-based metal layer and capable of conducting ions, wherein the polymer modification layer comprises at least catalytic amount of a Lewis acid, and the Lewis acid contains cations of a metal capable of forming an alloy-type active material with lithium.

In the lithium metal negative electrode of the present application, the polymer modification layer is obtained by means of in-situ polymerization of monomer on the surface of the lithium-based metal layer under the catalysis of the Lewis acid, and the polymer modification layer has ion conductivity, which can ensure the good lithium ion transmission performance of the negative electrode. In particular, the polymer modification layer can improve the deposition behavior of lithium on the surface of the lithium-based metal layer, such that lithium is deposited uniformly. In addition, the Lewis acid contains a metal cation. The metal in the Lewis acid near the lithium-based metal layer firstly forms an alloy-type active material with lithium, and the remaining metal in the Lewis acid will alloy with the newly deposited lithium during electrochemical charging. The lithium alloy has better lithiophilicity and lithium ion migration property, and the lithium alloys distributed on the surface of the lithium-based metal layer and in the modification layer can further adjust the uniform deposition of lithium. Therefore, by means of the double effects of the ion-conducting polymer and the lithium alloy, lithium can be uniformly deposited on the surface of the lithium metal negative electrode, and the growth of lithium dendrites can be inhibited, thereby greatly reducing the risk of internal short circuit in the lithium metal batteries and improving the safety performance.

In some embodiments, the polymer modification layer may include one or more of polyether, polyester and polyimine. As an example, the polyether may include, but is not limited to, one or more of polyethylene oxide, polypropylene oxide, polyethylene glycol, and polyethylene glycol dimethyl ether. The polyimine may include, but is not limited to, polyimide, etc. The polyester may include, but is not limited to, one or more of polycarbonate, polysulfate and polysulfonate. In some embodiments, the polymer in the polymer modification layer may also include other polymers that can be used in the solid electrolyte membrane; for example, polyolefins (such as polyethylene, polypropylene, polyvinylidene fluoride, polyvinyl chloride, etc.), polynitriles (such as polyacrylonitrile, etc.), polycarboxylates (such as polymethyl methacrylate, polymethyl acrylate, etc.).

In some embodiments, the polymer modification layer comprises one or more of polycarbonate, polysulfate, polysulfite and polysulfonate. The polycarbonate may include, but is not limited to, a polymer of one or more of the cyclic carbonate represented by formula (H1), and one or more of halogenated derivatives thereof. The polysulfate may include, but is not limited to, a polymer of one or more of the cyclic sulfate represented by formula (H2), and one or more of halogenated derivatives thereof. The polysulfite may include, but is not limited to, a polymer of one or more of the cyclic sulfite represented by formula (H3), and one or more of halogenated derivatives thereof. The polysulfonate may include, but is not limited to, a polymer of one or more of the cyclic sulfonate represented by formula (H4), and one or more of halogenated derivatives thereof. As used herein, halogenated derivatives mean that one or more hydrogens in organic compounds are substituted with halogens. The halogen includes F, Cl, Br, and I.

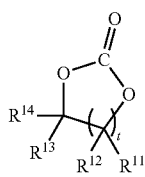 (H1)

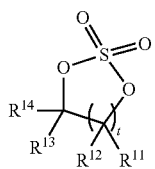 (H2)

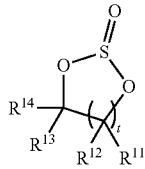 (H3)

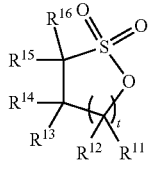 (H4)

In any embodiment, $R^{11}$, $R^{12}$, $R^{13}$, $R^{14}$, $R^{15}$ and $R^{16}$, at each occurrence, independently represent a hydrogen atom, a halogen atom, an alkyl having 1 to 4 carbon atoms, or a haloalkyl having 1 to 4 carbon atoms. The "halogen atom" includes F, Cl, Br, and I. "An alkyl having 1 to 4 carbon atoms" includes a linear or branched saturated hydrocarbon group containing 1 to 4 carbon atoms, for example alkyl such as methyl, ethyl, propyl (e.g., n-propyl, and isopropyl), and butyl (e.g., n-butyl, isobutyl, sec-butyl, and tert-butyl). "A haloalkyl having 1 to 4 carbon atoms" represents the alkyl having 1 to 4 carbon atoms in which one or more hydrogens are substituted with halogen atoms, for example F. An example of the haloalkyl having 1 to 4 carbon atoms may include —$CH_2F$, —$CHF_2$, —$CF_3$, —$CH_2CF_3$, —$C_2F_5$, —$(CH_2)_2CF_3$, —$C_3F_7$, —$(CH_2)_3CF_3$, and —$C_4F_9$, but is not limited thereto.

In any embodiment, t represents 1, 2, 3 or 4, for example 1 or 2, at each occurrence.

In some embodiments, the polymer of the modification layer comprise one or more of F, Cl, Br, and I. As an example, the monomer unit of the polymer contains F. By introducing halogens such as F, materials such as LiF can be formed with lithium, which can improve the surface stability of the lithium metal negative electrode, thereby improving the interface stability between the lithium metal negative electrode and the electrolyte, and further improving the cycling performance of the battery. In addition, a better first-cycle specific discharge capacity and first-cycle charge/discharge efficiency can be further achieved in the battery.

The polymer modification layer is obtained by means of in-situ polymerization of monomer on the surface of the lithium-based metal layer under the catalysis of the Lewis acid. The monomer can be the monomer corresponding to the polymer described above. In some embodiments, the monomer can be selected from one or more of cyclic carbonate (such as ethylene carbonate, propylene carbonate, etc.), cyclic sulfate (such as ethylene sulfate, propylene sulfate, etc.), cyclic sulfite (such as ethylene sulfite, propylene sulfite, etc.), cyclic sulfonate (such as 1,3-propane sultone, etc.), and halogenated derivatives thereof. In some embodiments, the monomer may include one or more of cyclic carbonate and halogenated derivatives thereof. As an example, the monomer may include one or more of ethylene carbonate (EC), polypropylene carbonate (PC), and halogenated derivatives thereof. The halogenated derivatives described above are, for example, fluoro derivatives. In some embodiments, the monomer may include one or more of ethylene carbonate, and fluoroethylene carbonate (FEC), for example fluoroethylene carbonate.

In some embodiments, the Lewis acid is selected from one or more of the compounds represented by formula (1): $A_nL_m$ (1).

A represents cations of Al, Zn, Mg, Pb, Ge, Sn or Sb. Optionally, A represents cations of Al or Zn. The lithium alloy formed by suitable A and lithium may have a better lithiophilicity and lithium ion migration property, which can further improve the safety performance and cycling performance of the battery.

L independently represents $F^-$, $Cl^-$, $Br^-$, $I^-$ or an anion represented by formula (2).

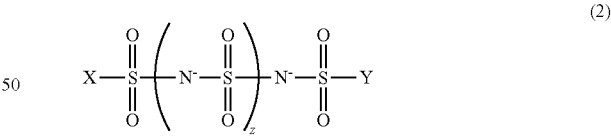 (2)

In formula (2), each X and Y independently represent F, Cl, Br, I, an alkyl having 1 to 4 carbon atoms, or a haloalkyl having 1 to 4 carbon atoms. As an example, the alkyl having 1 to 4 carbon atoms is selected from alkyl such as methyl, ethyl, propyl (for example n-propyl, isopropyl), butyl (for example n-butyl, isobutyl, sec-butyl, tert-butyl). The haloalkyl having 1 to 4 carbon atoms may be the alkyl having 1 to 4 carbon atoms described above, in which one or more hydrogens are substituted with halogen atoms, for example F.

In some embodiments, each X and Y independently represent F or a F-substituted alkyl having 1 to 4 carbon atoms. An example of the F-substituted alkyl having 1 to 4 carbon atoms includes —$CH_2F$, —$CHF_2$, —$CF_3$, —$CH_2CF_3$, —$C_2F_5$, —$(CH_2)_2CF_3$, —$C_3F_7$, —$(CH_2)_3CF_3$, and —$C_4F_9$, but is not limited thereto.

In formula (2), z is 0, 1, 2, 3 or 4. For example, z is 0 or 1.

In some embodiments, L may represent $F^-$, $Cl^-$, $Br^-$, $I^-$, $[(FSO_2)_2N]^-$, $[(CF_3SO_2)_2N]^-$, $[(FSO_2)(CF_3SO_2)N]^-$, $[(FSO_2)(C_2F_5SO_2)N]^-$, or $[(FSO_2)(C_4F_9SO_2)N]^-$. Optionally, L may represent $F^-$, $Cl^-$, $[(FSO_2)_2N]^-$, $[(CF_3SO_2)_2N]^-$, $[(FSO_2)(CF_3SO_2)N]^-$, $[(FSO_2)(C_2F_5SO_2)N]^-$, or $[(FSO_2)(C_4F_9SO_2)N]^-$.

In the process of electrochemical charging and discharging, halogens such as F in L can form compounds such as LiF with lithium, which can play a role of improving the interface stability between the lithium metal negative electrode and the electrolyte, thereby further improving the cycling performance of the battery.

n and m satisfy: the valence of A×n=the valence of L×m.

In some embodiments, the Lewis acid can be selected from one or more of $AlF_3$, $ZnF_2$, $AlCl_3$, $ZnCl_2$, $Al[(FSO_2)_2N]3$, $Zn[(FSO_2)_2N]_2$, $Al[(CF_3SO_2)_2N]_3$, $Zn[(CF_3SO_2)_2N]_2$, $Al[(FSO_2)(CF_3SO_2)N]_3$, $Zn[(FSO_2)(CF_3SO_2)N]_2$, $Al[(FSO_2)(C_2F_5SO_2)N]_3$, $Z_n[(FSO_2)(C_2F_5SO_2)N]_2$, $Al[(FSO_2)(C_4F_9SO_2)N]_3$, and $Zn[(FSO_2)(C_4F_9SO_2)N]_2$. Optionally, the Lewis acid can be selected from one or more of $AlF_3$, $ZnF_2$, $AlCl_3$, $ZnCl_2$, $Al[(FSO_2)_2N]_3$, $Zn[(FSO_2)_2N]_2$, $Al[(CF_3SO_2)_2N]_3$, $Zn[CF_3SO_2)_2N]_2$, $Al[(FSO_2)(CF_3SO_2)N]_3$, and $Zn[(FSO_2)(CF_3SO_2)N]_2$. Further optionally, the Lewis acid can be selected from one or more of $AlF_3$, $ZnF_2$, $AlCl_3$, $ZnCl_2$, $Al[(FSO_2)_2N]_3$, and $Zn[(FSO_2)_2N]_2$. Still further optionally, the Lewis acid can be selected from one or more of $AlCl_3$, $ZnCl_2$, $Al[(FSO_2)_2N]_3$ (abbreviated as $Al(FSI)_3$), and $Zn[(FSO_2)_2N]_2$.

In some embodiments, in the raw materials for forming the polymer modification layer, the parts by weight of the Lewis acid can be 1 to 35, for example 3 to 30, 5 to 25, 5 to 20, 8 to 16, or 10 to 20, based on 100 parts by weight of the monomer. The appropriate ratio of the Lewis acid to the monomer can initiate the polymerization and gelation of the monomer, which allows the modification layer to have a good strength and flexibility, thus effectively inhibiting the short circuit and improving the safety performance of the battery. At the same time, the reaction of the monomer is mild during polymerization, which greatly reduces the decomposition of the polymer caused by the strong reaction and the surface passivation of the lithium metal negative electrode, such that the battery can maintain a higher charge/discharge stability in the middle and later period of cycling, improve the cycling life, and can also allow the battery to have a higher first-cycle specific discharge capacity and first-cycle coulombic efficiency.

In some embodiments, the polymer modification layer further comprises a lithium salt. The ionic conductivity of the modification layer can be obtained or enhanced by adding a lithium salt in the polymer modification layer, and the polarization of the battery can be reduced, which is beneficial to the battery to have a higher cycling performance.

In some embodiments, the lithium salt may include one or more of an organic lithium salt and an inorganic lithium salt. The lithium salt can be selected from an electrolyte lithium salt known in the art. As an example, the lithium salt may include one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiBOB (lithium dioxalate borate), LiDFOB (lithium difluorooxalate borate), LiTFOP (lithium tetrafluorooxalate phosphate), $LiN(SO_2R_F)_2$, and $LiN(SO_2F)(SO_2R_F)$, in which $R_F$ represent $C_nF_{2n+1}$, and n is an integer from 0 to 10, for example, an integer from 0 to 6, for example, n is 0, 1 or 2. Optionally, $R_F$ represents F, $CF_3$, $C_2F_5$, $C_3F_7$, or $C_4F_9$. Optionally, an example of $LiN(SO_2R_F)_2$ may include $LiN(SO_2F)_2$ (lithium bisfluorosulfonimide, abbreviated as LiFSI), $LiN(SO_2CF_3)_2$ (bistrifluoromethane lithium sulfonimide, abbreviated as LiTFSI), etc. An example of $LiN(SO_2F)(SO_2R_F)$ may include LiFSI, $LiN(SO_2F)(SO_2CF_3)$, etc.

In some embodiments, the lithium salt can be selected from one or more of LiFSI, LiDFOB, and $LiN(SO_2F)(SO_2CF_3)$.

The modification layer is allowed to have a good film-forming effect by means of the design and addition of the lithium salt in the modification layer, thereby improving the cycling performance of the battery.

In some embodiments, the weight percentage of the lithium salt in the polymer modification layer is ≤60%, for example 5% to 60%, 10% to 40%, 5% to 20%, 10% to 20%, 5% to 15%, or 15% to 25%. An appropriate content of the lithium salt in the polymer modification layer allows it to have a good film-forming quality and a higher ionic conductivity, thereby improving the safety performance and cycling performance of the battery.

The weight percentage of the lithium salt in the modification layer can be tested by the method known in the art, for example ion chromatography. As a specific example, the dilution layer is infiltrated with water to dissolve the lithium salt in the water to obtain an aqueous solution; then anion content in the aqueous solution is tested by ion chromatograph, and the weight of the lithium salt is obtained from the anion content; the weight percentage of the lithium salt in the modification layer is calculated. The determination can made by referring to JY/T 020-1996 "General Principles of Ion Chromatography Analysis Methods".

In some embodiments, the polymer modification layer also optionally comprise an inorganic filler. Optionally, the inorganic filler includes one or more of $D_iE_j$, in which i and j satisfy: the valence of D×i=the valence of E×j. D may include one or more of B, Si, P, Ti, Al, Mg, Zr, Zn, Fe, Ba, Pd, and Li. E may represent O, N, S or $PO_4$. For example, the inorganic filler may include one or more of silicon dioxide ($SiO_2$), titanium oxide ($TiO_2$), aluminum oxide ($Al_2O_3$), magnesium oxide (MgO), zirconium oxide ($ZrO_2$), zinc oxide (ZnO), iron oxide ($Fe_3O_4$), barium titanate ($BaTiO_3$), lead titanate ($PbTiO_3$), lithium nitride ($Li_3N$), lithium aluminate ($LiAlO_2$), montmorillonite and molecular sieve. The inclusion of an inorganic filler in the polymer modification layer is beneficial to increase the ion transmission channels in the film layer, which can improve the lithium deposition and improve the ionic conductivity of the modification layer, thereby further improving the cycling performance of the battery.

In some embodiments, the inorganic filler has a volume-average particle size $D_v50$ of 50 nm to 1000 nm, for example 50 nm to 100 nm, 50 nm to 300 nm, 50 nm to 350 nm, 100 nm to 800 nm, 100 nm to 500 nm, 150 nm to 350 nm, or 500 nm to 1000 nm. When the particle size of the inorganic filler is within an appropriate range, the ionic conductivity as well as the mechanical strength of the modification layer can be further improved, thereby improving the cycling life of the battery.

In the present application, the volume-average particle size $D_v50$ of the inorganic filler has a meaning well-known in the art, and can be tested by a method known in the art. For example, a laser particle size analyzer (e.g. Malvern Master Size 3000) test. The test can made by referring to GB/T 19077.1-2016; wherein: Dv50 represents the particle size corresponding to the cumulative volume distribution percentage of the inorganic filler reaching 50%.

In some embodiments, the weight percentage of the inorganic filler in the modification layer is ≤10%. Optionally, the weight percentage of the inorganic filler in the modification layer is 1% to 10%, 1% to 5%, 2% to 6%, 3% to 8%, or 3% to 5%. An appropriate content of the inorganic filler in the modification layer can not only improving the ion transmission of the modification layer, but also allowing the modification layer to have a suitable mechanical strength and flexibility, such that the interfacial contact between the lithium metal negative electrode and the separator or solid electrolyte membrane (for example, an inorganic solid electrolyte membrane) is improved, the interface impedance is reduced, and thus the lithium deposition/dissolution behavior is improved and a better safety performance and cycling performance are achieved in the battery.

The weight percentage of the inorganic filler in the modification layer can be tested by a method known in the art. As an example, the modification layer can be successively washed with dimethyl carbonate and water for 3 times; the obtained solid material is dried at 120° C., and then weighed to obtain the weight of the inorganic filler in the modification layer; and the weight percentage of the inorganic filler in the modification layer is calculated.

In some embodiments, the polymer modification layer may have a thickness of 100 nm to 10 µm. For example, the polymer modification layer has a thickness of 200 nm to 7 µm, 300 nm to 5 µm, 500 nm to 3 µm, 1 µm to 5 µm, 1 µm to 3 µm, 2 µm to 5 µm, or 2 µm to 4 µm. The polymer modification layer has a suitable thickness, which can fully play the role of improving lithium deposition and effectively improve the safety performance of the battery; meanwhile, the battery may have a lower impedance and the cycling performance of the battery is improved. In addition, it is also beneficial for the battery to have a higher energy density.

In the present application, the thickness of the polymer modification layer can be tested by using a method known in the art. An exemplary test method is as follows: the lithium metal negative electrode is quenched with liquid nitrogen, and the cross-sectional morphology and thickness of the lithium metal negative electrode are tested by an environmental scanning electron microscope (SEM, for example Quanta200 FEI, FEI, Netherlands). As a specific example, the magnification of SEM is 1000×, the thickness values from 5 different regions are taken, and the average value is calculated as the thickness of the polymer modification layer.

In some embodiments, the polymer modification layer has a compressive modulus of elasticity of 0.01 MPa to 1 MPa, further optionally 0.02 MPa to 0.78 MPa, 0.1 MPa to 0.8 MPa, 0.3 MPa to 0.8 MPa, 0.4 MPa to 0.78 MPa, or 0.5 MPa to 0.75 MPa. The polymer modification layer is flexible and can further improve the interfacial contact between the lithium metal negative electrode and the separator or solid electrolyte membrane (for example, an inorganic solid electrolyte membrane) and reduce the interface impedance, thereby further improving the deposition/dissolution behavior of lithium, which can further improve the safety performance and cycling performance of the battery.

In the present application, the mixed solution for preparing the polymer modification layer can be coated on a stainless steel substrate, such that a catalytic polymerization reaction occurs to obtain a gelled product; the gelled product is cut into a cylindrical sample with a diameter of 10 mm and a thickness of 1 mm to 5 mm (for example, 1 mm); the sample is placed on an electronic universal mechanical testing machine MTS Exceed E43 for compression test, the compression rate is 10% thickness/min, 5 parallel samples are taken for each sample for the experiment, and the average value is taken. The compressive modulus of elasticity E of the gel is calculated by linear fitting of the data with compression ratio within 5%, and the calculation formula is as follows: $E=\sigma \cdot l/(S \cdot \Delta l)$, wherein: E represents the compressive modulus of elasticity (in Pa); $\sigma$ represents pressure (in N); l represents the thickness of the sample before compression deformation (in m); S represents the area of the sample before compression deformation (in m$^2$); and $\Delta l$ represents the thickness of the sample after compression deformation (in m).

In some embodiments, the lithium-based metal layer may include one or more of lithium metal and lithium alloy. The content of lithium element in the lithium alloy is optionally more than 30 wt %, more than 50 wt %, more than 70 wt %, more than 90 wt %, more than 95 wt %, more than 97 wt %, or more than 99 wt %. The lithium alloy may include, but is not limited to, one or more of a lithium-indium alloy, a lithium-zinc alloy, a lithium-magnesium alloy, a lithium-tin alloy, and a lithium-silver alloy.

In some embodiments, the lithium-based metal layer may have a thickness of 1 µm to 200 µm, for example 3 µm to 120 µm, 5 µm to 100 µm, 10 µm to 60 µm, 15 µm to 50 µm, or 20 µm to 30 µm.

In the lithium metal negative electrode of the present application, the negative electrode current collector can be a metal foil or a composite current collector (the composite current collector can be formed by providing a metal material on a polymer substrate). As an example, the negative current collector can be a copper foil, a carbon-coated copper foil, or a stainless steel sheet.

The present application also provides a method for preparing a lithium metal negative electrode, according to which any one of the lithium metal negative electrodes described above can be prepared. The method for preparing the lithium metal negative electrode comprises the steps of:

providing a lithium metal negative electrode to be modified comprising a negative electrode current collector and a lithium-based metal layer provided on at least one surface of the negative electrode current collector;

providing a mixed solution comprising a monomer and a Lewis acid; and covering the surface of at least one lithium-based metal layer with the mixed solution, such that an ion-conducting polymer modification layer is formed by means of the polymerization of the monomer under the catalysis of the Lewis acid, so as to obtain the lithium metal negative electrode.

The lithium metal negative electrode to be modified is commercially available or can be prepared by a method known in the art. As an example, a lithium-based metal foil can be laminated and compounded on any one surface or two opposite surfaces of the negative electrode current collector to obtain the lithium metal negative electrode to be modified. The lithium-based metal foil may be a metal lithium foil or a lithium alloy foil.

In the mixed solution, the Lewis acid and the monomer can be selected from one or more of those described herein, respectively. The ratio of the Lewis acid to the monomer may be as described above.

In some embodiments, the mixed solution further comprises a reaction moderator. The reaction moderator can adjust the reaction rate, so as to avoid too intense reaction and a large amount of heat release, such that the reaction can be carried out under a mild condition and the polymer can be prevented from decomposing. The polymer modification layer is a gelatinous elastic film layer with good quality, which can effectively improve the safety performance and cycling performance of the battery.

In some embodiments, the reaction moderator may include one or more of dimethyl carbonate (DMC), diethyl carbonate (DEC), dipropyl carbonate (DPC), ethyl methyl carbonate (EMC), methyl formate, ethyl formate, ethyl propionate, propyl propionate, methyl butyrate, ethyl acetate, N-methylpyrrolidone, N-methylformamide, N-methylacetamide, acetonitrile, sulfolane, dimethyl sulfoxide, methyl sulfide, diethyl sulfite, dimethyl sulfite, tetrahydrofuran, and cyclic ester as represented by formula (I).

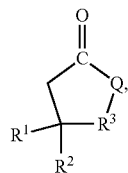

(I)

in formula (I), Q represents O or S. The cyclic ester represented by formula (I) may include one or more of (I-1) and (I-2).

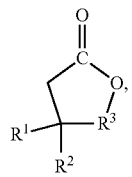

(I-1)

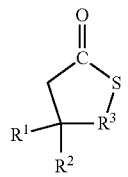

(I-2)

In each embodiments, $R^1$ and $R^2$ independently represent H, F, or a fluoroalkyl having 1 to 4 carbon atoms. "A fluoroalkyl having 1 to 4 carbon atoms" represents the alkyl having 1 to 4 carbon atoms in which one or more hydrogens are substituted with F. The alkyl having 1 to 4 carbon atoms may be as described herein. As an example, le and $R^2$ independently represent H, F, —$CH_2F$, —$CHF_2$, —$CF_3$, —$CH_2CF_3$, —$C_2F_5$, —$(CH_2)_2CF_3$, —$C_3F_7$, —$(CH_2)_3CF_3$, and —$C_4F_9$, but are not limited thereto.

In each embodiment, $R^3$ represents a fluoroalkylene having 1 to 3 carbon atoms. "A fluoroalkylene having 1 to 3 carbon atoms" represents the alkyl having 1 to 3 carbon atoms in which one or more hydrogens are substituted with F. The alkyl having 1 to 3 carbon atoms includes a linear or branched saturated hydrocarbon group containing 1 to 3 carbon atoms, for example alkyl such as methyl, ethyl, propyl (e.g., n-propyl, and isopropyl). As an example, $R^3$ may represent —$CH_2F$, —$CHF_2$, —$CF_3$, —$CH_2CF_3$, —$C_2F_5$, —$(CH_2)_2CF_3$, and —$C_3F_7$, but is not limited thereto.

In some embodiments, the reaction moderator may include one or more of dimethyl carbonate (DMC), diethyl carbonate (DEC), dipropyl carbonate (DPC), and ethyl methyl carbonate (EMC). For example, the reaction moderator includes ethyl methyl carbonate.

In some embodiments, in the mixed solution, the parts by weight of the reaction moderator may be greater than 0 and less than or equal to 800, based on 100 parts by weight of the monomer. For example, the parts by weight of the reaction moderator is 50 to 750, 60 to 500, 60 to 200, 70 to 350, 70 to 300, 80 to 250, 100 to 200, or 120 to 185, etc, based on 100 parts by weight of the monomer. An appropriate content of the reaction moderator is beneficial to control the reaction rate, reduce the interface side reaction during the polymerization reaction, improve the interface stability, and meanwhile allow the polymer modification layer to have a suitable strength and flexibility, thereby improving the safety performance and cycling performance of the battery, as well as the first-cycle specific discharge capacity and the first-cycle coulombic efficiency.

In some embodiments, the mixed solution may optionally comprise a lithium salt. The lithium salt can be selected from one or more of the lithium salts described herein.

In some embodiments, the content of the lithium salt is 200 parts by weight or less, for example 10 to 200, 20 to 150, 25 to 100, 30 to 80, or 40 to 60 parts by weight, based on 100 parts by weight of the monomer.

In some embodiments, the mixed solution may optionally comprise an inorganic filler. The inorganic filler can be selected from one or more of the inorganic fillers described herein.

In some embodiments, in the mixed solution, the content of the inorganic filler is 30 parts by weight or less, for example 20 parts by weight or less, or 10 parts by weight or less, based on 100 parts by weight of the monomer. Optionally, in the mixed solution, the content of the inorganic filler is 1 to 30, 3 to 20, 5 to 15, 5 to 10, 8 to 15, 10 to 20, or 10 to 15 parts by weight, based on 100 parts by weight of the monomer.

In some embodiments, the lithium metal negative electrode to be modified can be dipped in the mixed solution, or the mixed solution can be coated onto the surface of the lithium-based metal layer of the lithium metal negative electrode to be modified, such that the mixed solution covers the surface of the lithium-based metal layer. The in-situ polymerization reaction of the monomer is carried out on the surface of the lithium-based metal layer of the lithium metal negative electrode to be modified under the catalysis of the Lewis acid. The dipping and coating can be carried out by a method known in the art. For example, the mixed solution can be coated onto the surface of the lithium-based metal layer by means of blade coating, spin coating, and spray coating.

After covering the surface of the lithium-based metal layer with the mixed solution, it can be allowed to stand for 5 min to 50 h to complete the polymerization reaction, so as to obtain the polymer modification layer. Optionally, the standing time is 10 min to 10 h, 15 min to 120 min, 20 min to 100 min, 20 min to 60 min, 30 min to 150 min, 30 min to 90 min, or 40 min to 60 min.

The present application also provides a lithium metal battery. The lithium metal battery according to the present application comprises a positive electrode plate and a negative electrode plate, and the negative electrode plate is any lithium metal negative electrode of the present application.

Since the lithium metal negative electrode of the present application is used for the lithium metal battery of the present application, the safety performance can be improved while achieving a higher energy density. In addition, lithium metal batteries may also have a higher cycling performance, first-cycle specific discharge capacity and initial charge/discharge efficiency.

[Positive Electrode Plate]

In the lithium metal battery of the present application, the positive electrode plate comprises a positive electrode current collector and a positive electrode film layer which is provided on at least one surface of the positive electrode current collector and comprises a positive electrode active material. For example, the positive electrode current collector has two opposite surfaces in the thickness direction thereof, and the positive electrode film layer is provided on either or both of the two opposite surfaces of the positive electrode current collector.

The positive electrode current collector can be a metal foil or a composite current collector (the composite current collector can be formed by providing a metal material on a polymer substrate). As an example, the positive electrode current collector can be selected from an aluminum foil, a carbon-coated aluminum foil, or a stainless steel sheet.

The positive electrode active material can be a positive electrode active material known in the art for lithium ion batteries. For example, the positive electrode active material may comprise one or more of layered lithium transition metal oxides, lithium transition metal oxides with a spinel structure, lithium-containing phosphates with a olivine structure, and respective modified materials thereof. An example of the layered lithium transition metal oxide may include, but is not limited to, one or more of lithium cobaltate (e.g., $LiCoO_2$), lithium nickelate (e.g., $LiNiO_2$), ternary materials (e.g., $LiNi_sB_tC_{(1-s-t)}O_2$, in which B and C are independently selected from Co, Al and Mn, and B and C are different, 0<s<1, 0<t<1), and modified materials thereof. The lithium transition metal oxide with a spinel structure may include, but is not limited to, one or more of lithium manganate ($LiMn_2O_4$), lithium nickel manganate ($LiNi_{0.5}Mn_{1.5}O_4$), and modified materials thereof. An example of the lithium-containing phosphate with a olivine structure may include, but is not limited to, one or more of lithium iron phosphate ($LiFePO_4$), lithium cobalt phosphate ($LiCoPO_4$), lithium manganese phosphate ($LiMnPO_4$), lithium nickel phosphate ($LiNiPO_4$), iron phosphate ($FePO_4$), and respective modified materials thereof.

In some embodiments, the positive electrode active material may comprise one or more of lithium transition metal oxides represented by formula (3) and modified compounds thereof in order to further improve the energy density of the battery,

$$Li_aNi_bCo_cM_dO_eA_f \qquad (3),$$

in formula (3), 0.8≤a≤1.2, 0.5≤b≤1, 0<c<1, 0<d<1, 1≤e≤2, and 0≤f≤1, M is selected from one or more of Mn, Al, Zr, Zn, Cu, Cr, Mg, Fe, V, Ti and B, and A is selected from one or more of N, F, S and Cl.

Optionally, 0.5≤b≤0.9, 0.5≤b≤0.8, 0.6≤b≤0.8, or 0.6≤b≤0.75. The working voltage window of the battery can be improved by using the lithium transition metal oxide, such that the battery can have a higher energy density and also have a higher cycling performance.

Optionally, M is selected from one or more of Mn and Al. Optionally, A is F.

In the present application, the modified materials of the materials described above can be obtained from the doping modification or surface coating modification of the positive electrode active material. The element for doping and coating can be independently selected from metal and nonmetal elements, for example one or more of Li, N, F, Cl, S, B, P, Al, Si, Zr, Ti, Ge, Sn, Mg, Zn, Ce, W, V, etc.

In the lithium metal battery of the present application, the positive electrode film layer generally comprises a positive electrode active material, an optional positive electrode solid electrolyte, an optional binder and an optional conductive agent, which is generally formed by coating with a positive electrode slurry, followed by drying and compacting. The positive electrode slurry is generally formed by dispersing a positive electrode active material, an optional positive electrode solid electrolyte, an optional conductive agent and a binder in a solvent, and then uniformly stirring same. The mixing method of the positive electrode slurry can be a well-known mixing method in the industry, such as magnetic stirring, mechanical ball milling, etc.

In some embodiments, the positive electrode film layer comprises a positive electrode solid electrolyte. The positive electrode film layer can be combined with a solid electrolyte membrane and a lithium metal negative electrode to form a solid lithium metal battery. Due to the use of the solid electrolyte membrane in the solid lithium metal battery, there is no risk of electrolyte solution leakage, and at the same time, the piercing of lithium dendrites can be inhibited, and the safety performance can be improved.

The positive electrode solid electrolyte can be a material known in the art and can be selected according to actual requirements. For example, the positive electrode solid electrolyte can be one or more of a sulfide solid electrolyte, an oxide solid electrolyte, and a polymer solid electrolyte.

In some embodiments, the oxide electrolyte may include one or more of a compound with a structure of NASICON ($Na^+$ super ionic conductor) (e.g., $NaE_2(PO_4)_3$, in which E represents Ti, Zr or Ge), a compound with a structure of LISICON ($Li^+$ super ionic conductor) (e.g., $Li_{14}Zn(GeO_4)_4$), a compound with a structure of garnet (e.g., $Li_7La_3L_2O_{12}$, in which L represents Zr or Sn), and a compound with a structure of perovskite (e.g., $Li_{3x}La_{1-3x}TiO_3$, in which 0≤x≤0.16).

In some embodiments, the sulfide electrolyte may include $Li_{10}MP_2S_{12}$, $Li_6(P_{1-a}M_a)S_5X$, $Li_3PS_4$, and $Li_7P_3S_{11}$, in which M is one or more of Ge, Si, Sn and Sb; X is one or more of F, Cl, Br and I; 0.01≤a≤1. As an example, the oxide electrolyte can be selected from one or more of $Li_3PS_4$, $Li_{10}GeP_2S_{12}$, and $Li_6PS_5Cl$.

In some embodiments, the polymer solid electrolyte may include one or more of polyether (PEO), polyacrylonitrile (PAN), polyacrylate (PMMA), and polyvinylidene fluoride (PVDF).

In some embodiments, the binder may include one or more of a styrene-butadiene-styrene triblock thermoplastic elastomer (SBS), an ethylene-butylene copolymer (SEBS), polyvinylidene fluoride (PVDF), polytetrafluoroethylene (PTFE), lithium polyacrylate (PAALi), styrene-butadiene rubber, nitrile rubber, butylene rubber, styrene rubber or polyurethane.

In some embodiments, the conductive agent may include one or more of conductive carbon black (super-P), acetylene black, vapor-grown carbon fiber (VGCF for short), carbon nanotubes, and graphene.

In the positive electrode slurry, the solvent can be selected from organic solvents, for example one or more of an ether solvent, a hydrocarbon solvent, an ester solvent, a nitrile solvent, an amide solvent, an alcohol solvent, and a halogenated hydrocarbon solvent. Specifically, the ether solvent can be selected from one or more of diethyl ether, tetrahydrofuran (THF), and ethylene glycol dimethyl ether. The hydrocarbon solvent can be selected from one or more of n-pentane, n-hexane, cyclohexane, toluene, xylene, and trimethylbenzene. The ester solvent can be selected from one or more of ethyl acetate, methyl formate, and dimethyl phthalate. The nitrile solvent may include acetonitrile.

The amide solvent can be selected from one or more of N-methylpyrrolidone (NMP) and N,N-dimethylformamide (DMF). The alcohol solvent may include ethanol. The halogenated hydrocarbon solvent can be selected from one or more of dichloromethane and 1,2-dichloroethane. In some embodiments, the solvent of the positive electrode slurry may be N-methylpyrrolidone (NMP) and/or tetrahydrofuran (THF).

The drying and compacting are carried out by methods and devices known in the art. In some embodiments, the positive electrode slurry comprises a positive electrode solid electrolyte, and the drying and compacting are optionally carried out under the protection of a protective gas. The protective gas may be nitrogen or an inert gas, for example argon. In these embodiments, the compacting can be carried out at a pressure of 20 MPa to 500 MPa, for example 200 MPa to 300 MPa. The compacting can be carried out at a temperature of 20° C. to 160° C., for example 20° C. to 100° C. The positive electrode active material layer may have a compacted density of 1.8 g/cm$^3$ to 4.2 g/cm$^3$, for example 2.8 g/cm$^3$ to 4.0 g/cm$^3$.

In some embodiments, the positive electrode active material layer comprises a positive electrode active material, a positive electrode solid electrolyte, a conductive agent and a binder. Reasonable adjustment of the content of each component in the positive electrode active material layer can build a good conduction network of electrons and lithium ions, thereby improving the cycling performance of the battery.

Optionally, the mass percentage of the positive electrode active material in the positive electrode active material layer is 48% to 90%, for example 60% to 75%, 70% to 85%, or 65% to 80%. An appropriate percentage of the positive electrode active material in the positive electrode active material layer is not only beneficial to the transmission of the electrons and lithium ions, but also beneficial to the higher energy density of the battery. Optionally, the mass percentage of the positive electrode solid electrolyte in the positive electrode active material layer is 8% to 50%, for example 10% to 40%, 15% to 30%, or 10% to 25%. The mass percentage of the conductive agent in the positive electrode active material layer can be 1% to 10%, for example 2% to 8%, 3% to 6%, 4% to 7%, or 2% to 5%. The mass percentage of the binder in the positive electrode active material layer can be 1% to 10%, for example 2% to 8%, 3% to 6%, 4% to 7%, or 2% to 5%.

In some embodiments, the positive electrode active material layer may have a thickness of 10 μm to 200 μm. For example, the positive electrode active material layer have a thickness of 40 μm to 160 μm, 60 μm to 120 μm, or 80 μm to 140 μm, etc. When the thickness of the positive electrode active material layer is within an appropriate range, it is beneficial to improve the capacity of the positive electrode and allow the battery to have a higher energy density; at the same time, it also allows the positive electrode active material layer to have a lower lithium ion transmission impedance and reduce polarization, such that the battery has a higher cycling performance.

[Electrolyte]

In the lithium metal battery of the present application, the electrolyte can be an electrolyte known in the art, and can be selected by a person skilled in the art according to requirements. For example, the electrolyte can be selected from a solid electrolyte membrane, or a liquid electrolyte (i.e., an electrolyte solution).

In some embodiments, the electrolyte can be a solid electrolyte membrane. The solid electrolyte membrane is provided between the negative electrode plate and the positive electrode plate for conducting ions. The solid electrolyte membrane can be selected from one or more of an inorganic solid electrolyte membrane, a solid polymer electrolyte membrane and an inorganic-organic composite solid electrolyte membrane. Compared with the electrolyte solution, the use of the solid electrolyte membrane has no risk of liquid leakage, which further improves the safety performance of the battery. In these embodiments, the lithium metal battery is an all-solid battery-state or a semi-solid-state battery.

In some embodiments, the solid electrolyte membrane is selected from an inorganic solid electrolyte membrane. The use of the inorganic solid electrolyte membrane is beneficial to increase the voltage window of the battery, thereby improving the energy density. The surface of the lithium metal negative electrode has a polymer modification layer with an appropriate flexibility, which can significantly improve the contact between the lithium metal negative electrode and the inorganic solid electrolyte membrane, reduce the interface impedance, and the polymer modification layer can also improve the deposition and dissolution of lithium, such that the growth of lithium dendrites can be greatly reduced, the risk of inner short circuit in the battery can be reduced, and the safety performance can be improved. Further, the cycling performance of the battery can also be improved.

The inorganic solid electrolyte membrane comprises an inorganic solid electrolyte and an optional binder.

In the inorganic solid electrolyte membrane, the inorganic solid electrolyte may include one or more of an oxide electrolyte and a sulfide electrolyte.

In some embodiments, the oxide electrolyte may include one or more of a compound with a structure of NASICON, a compound with a structure of LISICON, a compound with a structure of garnet, and a compound with a structure of perovskite. As an example, the oxide electrolyte can be selected from $NaE_2(PO_4)_3$, in which E represents Ti, Zr or Ge; $Li_{14}Zn(GeO_4)_4$; $Li_7La_3L_2O_{12}$, in which L represents Zr or Sn; $Li_{3x}La_{1-3x}TiO_3$, in which $0<x<0.16$.

In some embodiments, the sulfide electrolyte may include $Li_{10}MP_2S_{12}$, $Li_6(P_{1-a}M_a)S_5X$, $Li_3PS_4$, and $Li_7P_3S_{11}$, in which M is selected from one or more of Ge, Si, Sn and Sb; X is selected from one or more of F, Cl, Br and I; $0.01 \leq a \leq 1$. As an example, the oxide electrolyte can be selected from one or more of $Li_3PS_4$, $Li_{10}GeP_2S_{12}$, and $Li_6PS_5Cl$.

In the inorganic solid electrolyte membrane, the binder can be selected from one or more of a styrene-butadiene-styrene triblock thermoplastic elastomer (SBS), an ethylene-butylene copolymer (SEBS), polyvinylidene fluoride (PVDF), polytetrafluoroethylene (PTFE), lithium polyacrylate (PAALi), a vinylidene fluoride-hexafluoropropylene copolymer (PVDF-HFP), styrene-butadiene rubber, nitrile rubber, butylene rubber, styrene rubber or polyurethane.

In the inorganic solid electrolyte membrane, the mass ratio of the inorganic solid electrolyte to the binder can be 99 to 50:1 to 50, for example 98 to 80:2 to 20. When the mass ratio of the inorganic solid electrolyte to the binder is within an appropriate range, the inorganic solid electrolyte membrane is allowed to have higher strength and toughness, as well as a higher lithium ion transmission performance, such that the cycling performance of the battery can be improved.

The inorganic solid electrolyte membrane is commercially available or prepared by the method known in the art, for example, by forming a membrane from an electrolyte slurry comprising an inorganic solid electrolyte and an optional binder. An exemplary preparation method is as follows: an inorganic solid electrolyte and a binder are dispersed into an organic solvent to form an electrolyte slurry; then the electrolyte slurry is uniformly coated on a substrate (for example, a plastic substrate, a glass substrate, etc.), followed by drying and press-molding to obtain an inorganic solid electrolyte membrane.

In the electrolyte slurry, the organic solvent should not react with the solid electrolyte, for example, it can be selected from one or more of an ether solvent, a hydrocarbon solvent, an ester solvent, a nitrile solvent, an amide solvent, an alcohol solvent and a halogenated hydrocarbon solvent. For example, they may include those described herein, respectively. In some embodiments, the organic solvent includes N-methylpyrrolidone (NMP) and/or tetrahydrofuran (THF).

In the preparation of the inorganic solid electrolyte membrane, the amount of the organic solvent can be adjusted according to the viscosity of the electrolyte slurry. Optionally, the electrolyte slurry has a viscosity of 5000 mPa·s to 200000 mPa·s, for example 5000 mPa·s to 100000 mPa·s, or 10000 mPa·s to 50000 mPa·s. When the viscosity of the electrolyte slurry is within an appropriate range, it is convenient for coating, and can reduce the pores in the inorganic solid electrolyte membrane, reduce the risk of inner short circuit in the battery to a certain extent, and improve the safety performance.

The coating, drying and press-molding of the slurry can all be carried out by methods and devices known in the art. In some embodiments, the drying step may comprise: the coating is naturally dried for 1-1.5 h, and then dried in vacuum for 1-3 h.

In some embodiments, the pressing method may be one-step pressing or step-by-step pressing. The pressing can be carried out at a pressure of 1 MPa to 500 MPa, for example 100 MPa to 300 MPa. The pressing can be carried out at a temperature of 20° C. to 160° C., for example 20° C. to 100° C., 40° C. to 100° C., or 60° C. to 90° C. When the pressure and temperature for pressing are within an appropriate range, it is beneficial for the membrane sheet to have a higher density, such that the membrane sheet has a good strength; and it can also ensure that the solid electrolyte membrane has a good ion transmission performance.

In some embodiments, the electrolyte can also be an electrolyte solution. The electrolyte solution comprises an electrolyte lithium salt and a solvent. The electrolyte lithium salt and the solvent can both be the materials known in the art and can be selected by a person skilled in the art according to requirements.

As an example, the electrolyte lithium salt can be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bisfluorosulfonimide), LiTFSI (lithium bistrifluoromethanesulfonimide), LiTFS (lithium trifluoromethanesulfonate), LiDFOB (lithium difluorooxalate borate), LiBOB (lithium dioxalate borate), $LiPO_2F_2$ (lithium difluorophosphate), LiDFOP (lithium difluorodioxalate phosphate), and LiTFOP (lithium tetrafluorooxalate phosphate).

As an example, the solvent can be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate, ethyl propyl carbonate, butylene carbonate, fluoroethylene carbonate (FEC), methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution may optionally comprise an additive. For example, the additive may comprise negative electrode film-forming additives, positive electrode film-forming additives, and additives that can improve certain performance of the battery, such as additives that improve overcharge performance of the battery, additives that improve high-temperature performance of the battery, and additives that improve low-temperature performance of the battery.

In the lithium metal battery and semi-solid-state lithium metal battery using the electrolyte solution, a separator is further comprised. The separator is provided between the positive electrode plate and the negative electrode plate to play a role of isolation. The types of the separator is not particularly limited in the present application, and any known separator can be selected. In some embodiments, the separator can be selected from one of a glass fiber film, a non-woven fabric, a polyethylene film, a polypropylene film and a polyvinylidene fluoride film or a multilayer composite film comprising two or more of them.

In some embodiments, the positive electrode plate, the negative electrode plate and the separator may be wound or laminated to form an electrode assembly. As an example, the positive electrode plate, the inorganic solid electrolyte membrane and the lithium metal negative electrode are sequentially stacked, wherein the inorganic solid electrolyte membrane is located between the positive electrode plate and the lithium metal negative electrode; then the stacked units are pressed and compounded together to form an electrode assembly of a solid lithium metal battery. The pressing and compounding may be carried out at a pressure of 1 MPa to 500 MPa, for example 100 MPa to 300 MPa. The pressing and compounding may be carried out at a temperature of 20° C. to 160° C., for example 25° C. to 60° C., or 60° C. to 120° C.

In some embodiments, the lithium metal battery may comprise an outer package. The outer package can be used to package the electrode assembly and the electrolyte solution, if needed.

In some embodiments, the outer package of the lithium metal battery may be a hard case, for example a hard plastic case, an aluminum case, a steel case, etc. The outer package of the lithium metal battery may also be a soft package, for example a bag-type soft package. The material of the soft package may be plastic, for example one or more of polypropylene (PP), polybutylene terephthalate (PBT), polybutylene succinate (PBS), etc.

Figure 2:
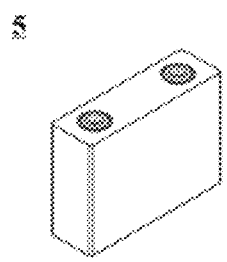
FIG. 2 is a schematic diagram of a lithium metal battery provided by an embodiment of the present application.

The shape of the lithium metal battery is not particularly limited in the present application, and may be cylindrical, square or any other shape. FIG. 2 is an exemplary prismatic lithium metal battery 5.

Figure 3:
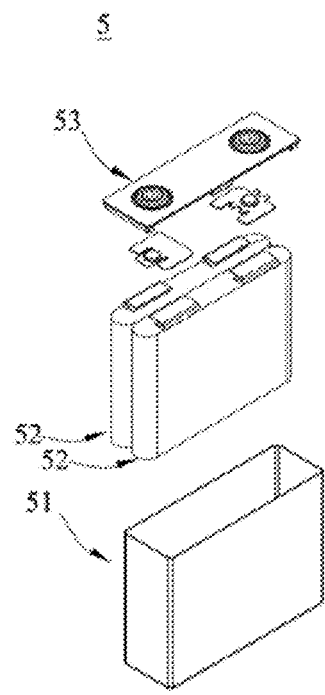
FIG. 3 is an exploded view of FIG. 2.

In some embodiments, referring to FIG. 3, the outer package may comprise a case 51 and a cover plate 53. The case 51 may comprise a bottom plate and a side plate connecting to the bottom plate, the bottom plate and the side plate are enclosed to form an accommodating cavity. The case 51 has an opening communicating with the accommodating cavity, and the cover plate 53 is used for covering the opening to close the accommodating cavity. The positive electrode plate, the inorganic solid electrolyte membrane and the lithium metal negative electrode can be laminated to form an electrode assembly 52. The electrode assembly 52 is packaged in the accommodating cavity. The number of the electrode assembly 52 included in the lithium metal battery 5 may be one or more, and can be adjusted according to requirements.

In some embodiments, the lithium metal battery can be assembled into a battery module. The battery module may comprise a plurality of lithium metal batteries, and the specific number thereof may be adjusted according to the application and capacity of the battery module.

Figure 4:
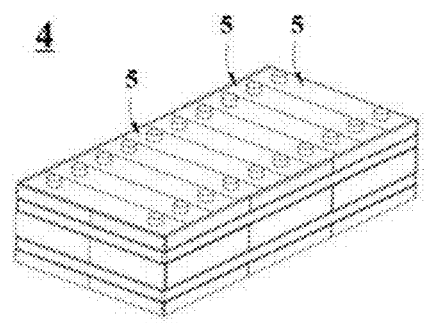
FIG. 4 is a schematic diagram of a battery module provided by an embodiment of the present application.

FIG. 4 is an exemplary battery module 4. Referring to FIG. 4, in the battery module 4, a plurality of lithium metal batteries 5 may be arranged sequentially along a length direction of the battery module 4. Of course, they can also be arranged in any other manner. Further, a plurality of lithium metal batteries 5 can be fixed by a fastener.

Optionally, the battery module 4 may further include a case having an accommodating space in which a plurality of lithium metal batteries 5 are accommodated.

In some embodiments, the battery module described above may be further assembled into a battery pack, and the number of the battery modules included in the battery pack may be adjusted according to the application and capacity of the battery pack.

Figure 5:
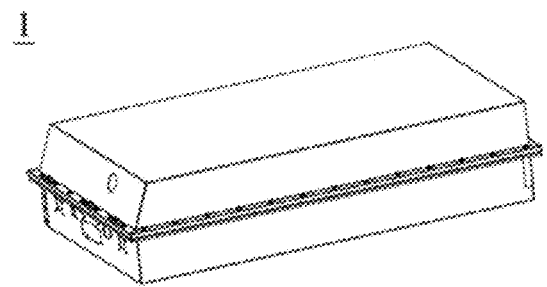
FIG. 5 is a schematic diagram of a battery pack provided by an embodiment of the present application.
Figure 6:
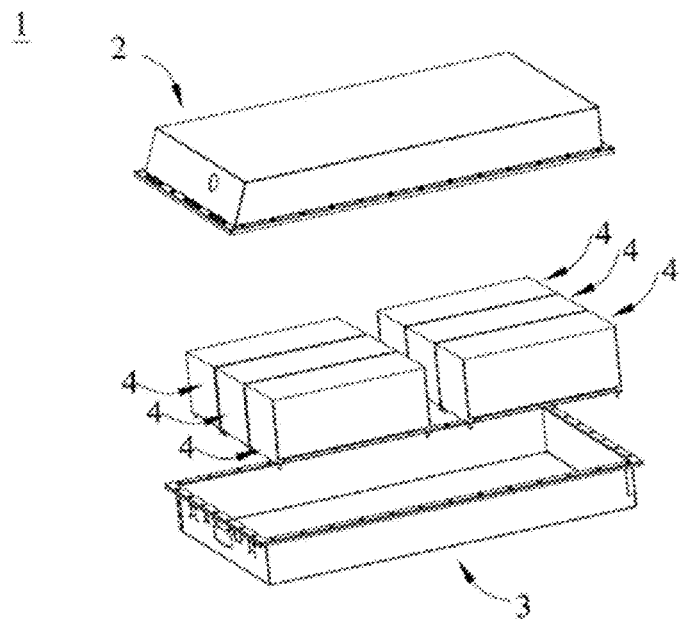
FIG. 6 is an exploded view of FIG. 5.

FIG. 5 and FIG. 6 are exemplary battery packs 1. Referring to FIG. 5 and FIG. 6, the battery pack 1 may include a battery case and a plurality of battery modules 4 provided in the battery case. The battery case includes an upper case body 2 and a lower case body 3, and the upper case body 2 is used to cover the lower case body 3 to form a closed space for accommodating the battery modules 4. A plurality of battery modules 4 can be arranged in the battery case in any manner.

The present application further provides a device comprising at least one of the lithium metal battery, battery module or battery pack of the present application. The lithium metal battery, battery module or battery pack may be used as a power source of the device or as an energy storage unit of the device. The device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like.

A lithium metal battery, a battery module, or a battery pack may be selected for use in the device according to use requirements.

Figure 7:
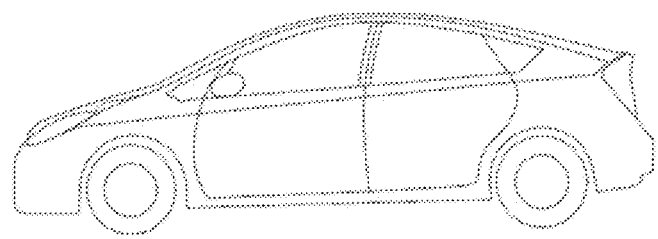
FIG. 7 is a schematic diagram of a device provided by an embodiment of the present application.

FIG. 7 is an exemplary device. The device is a battery electric vehicle, a hybrid electric vehicle, or a plug-in hybrid electric vehicle, etc. The device can use a battery pack or a battery module.

EXAMPLES

The following examples more specifically describe the content disclosed in the present application, and these examples are only used for explanatory description, because various modifications and changes within the scope of the present disclosure are obvious to those skilled in the art. Unless otherwise noted, all parts, percentages, and ratios reported in the following examples are on a weight basis, and all reagents used in the examples are commercially available and used directly without further treatment, and the instruments used in the examples are commercially available.

Example 1

1. Preparation of Mixed Solution

3% Lewis acid of $AlCl_3$ is added to a monomer solution of LiFSI/FEC/EMC (at a mass ratio of 15:30:55), and uniformly mixed to obtain a mixed solution. The added amount (%) of the Lewis acid=the mass of the Lewis acid/the mass of the monomer solution×100%. By calculation, the Lewis acid of $AlCl_3$ is 10 parts by weight, the lithium salt of LiFSI is 50 parts by weight, and the reaction moderator is 183.3 parts by weight, based on 100 parts by weight of the monomer of FEC.

2. Preparation of Lithium Metal Negative Electrode

In a drying room, a 25 μm lithium metal foil is attached to the surface of a copper foil by a calendering method, and sliced. The mixed solution described above is coated onto the surface of a lithium metal layer using a scraper blade, and after standing for 50 min, a polymer modification layer with a thickness of 3 μm is formed on the surface of the lithium metal layer.

3. Preparation of Positive Electrode Plate

In a glove box, a positive electrode active material of $LiNi_{0.6}Co_{0.2}Mn_{0.2}O_2$ (NCM622), a sulfide solid electrolyte of $Li_3PS_4$, a conductive agent of VGCF, and a binder of butadiene-styrene rubber (with a number-average molecular weight of about 500,000) are mixed at a weight ratio of 70:20:5:5 in a solvent of THF, and thoroughly stirred and uniformly mixed to obtain a positive electrode slurry; the positive electrode slurry is coated onto the surface of an aluminum foil, dried naturally, followed by drying at 60° C., cold pressing and slicing to obtain a positive electrode plate, wherein the positive electrode active material layer has a thickness of 50 μm and a compacted density of 3 $g/cm^3$.

4. Preparation of Inorganic Solid Electrolyte Membrane

In a glove box, a sulfide solid electrolyte of $Li_3PS_4$ and a binder of butadiene-styrene rubber are mixed at a weight ratio of 99:1 in a solvent of THF to prepare an electrolyte slurry; then the electrolyte slurry is coated onto the surface of a glass substrate, followed by drying at 60° C. and slicing to obtain a sulfide solid electrolyte membrane, wherein the sulfide solid electrolyte membrane has a thickness of 50

5. Preparation of all-Solid Lithium Metal Battery

A positive electrode plate, a sulfide solid electrolyte membrane and a lithium metal negative electrode are centrally aligned and laminated in sequence, and cold pressed at room temperature (25° C.) and 250 MPa for 2 min to obtain laminated units; then 10 laminated units are stacked, cold pressed, packaged in an outer package, and molded to obtain a solid lithium metal battery.

6. Preparation of Li/Li Symmetrical Battery

The lithium metal negative electrode, sulfide solid electrolyte membrane and lithium metal sheet described above are centrally aligned and laminated in sequence, and cold pressed at room temperature and 250 MPa for 2 min to obtain laminated units, which are then placed in an outer package for packaging, followed by molding to obtain a solid symmetrical lithium metal battery.

Examples 2-19 and Comparative Example 1-3

The preparation method is similar to that in Example 1, except that the relevant parameters in the preparation steps of the lithium metal negative electrode have been adjusted to obtain the corresponding lithium metal batteries, see Table 1 for details.

In Example 17, the inorganic filler may be $Al_2O_3$ with a particle size of 500 nm, wherein the added amount of the inorganic filler (%)=the mass of the inorganic filler/the mass of the monomer solution×100%.

Test Section

1. Test of Li/Li Symmetrical Battery

A cycling test is carried out by constant current charging and discharging, in which the deposition/dissolution capacity is defined as 6 mAh/cm², and the test is carried out at a current density of about 0.39 mA/cm² and a temperature of 25° C.

Figure 8:
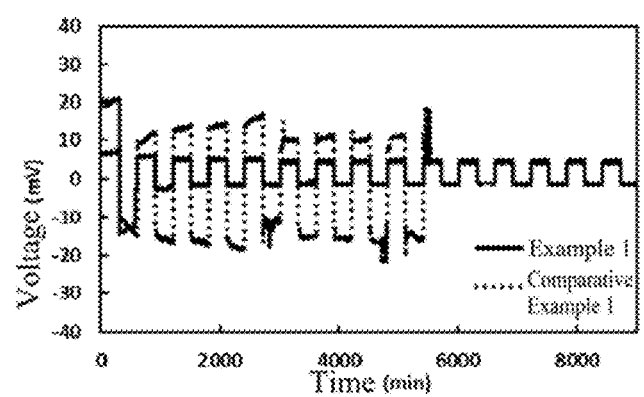
FIG. 8 is a cycle graph of Li/Li symmetrical lithium metal batteries of Example 1 and Comparative Example 1 of the present application.

FIG. 8 shows cycling curves of Li/Li symmetrical lithium metal batteries of Example 1 and Comparative Example 1. It can be seen from FIG. 8 that the Li/Li symmetrical battery of Example 1 uses the lithium metal negative electrode of the present application, in which an ion-conducting polymer modification layer is formed on the surface of the lithium-based metal layer under the catalysis of a Lewis acid, and the Lewis acid contains cations of a metal capable of forming an alloy-type active material with lithium, such that the interface stability between the lithium metal negative electrode and the inorganic solid electrolyte membrane is improved, and the Li/Li symmetrical battery shows a good cycling stability. The overpotential in the first cycle is higher than that in the second cycle, possibly due to the occurrence of the lithium alloying process. However, the Li/Li symmetric battery of Comparative Example 1 uses an unmodified lithium metal negative electrode, and the charge/discharge curve thereof is relatively disordered, in which the overpotential is relatively high in the early stage, so that a side reaction occurs between the lithium negative electrode surface and the electrolyte, resulting in a higher interface impedance therebetween, and a rapid voltage change occurs in the later cycling, with severe polarization.

2. Test of Solid Lithium Metal Battery 1) at 25° C., the solid lithium metal batteries prepared in the examples and comparative examples are tested by constant current charging and discharging, specifically: charging at a constant current of 0.1 C (with a current density of about 0.13 mA/cm²) to a voltage of 4.2 V, and then charging at a constant voltage to a current of 0.05 C, and recording the first-cycle specific charge capacity; standing for 5 min, then discharging at a constant current of 0.1 C to a voltage of 2.8 V, and recording the first-cycle specific discharge capacity. The batteries are subjected to the charge/discharge cycling test according to the method described above, and the specific discharge capacity in the 200th cycle is recorded.

The first-cycle coulombic efficiency of the solid lithium metal battery=the first-cycle specific discharge capacity/the first-cycle specific charge capacity×100%.

The capacity retention rate of the solid lithium metal battery after 200 cycles=the specific discharge capacity in the 200th cycle/the first-cycle specific discharge capacity×100%. 2) Short circuit rate: according to the method in 1), the batteries are subjected to the charge/discharge cycling test for 200 cycles, and the number of solid lithium metal batteries in which short circuit occurs during the test, from 100 solid lithium metal batteries, is recorded, and the percentage of the solid lithium metal batteries in which short circuit occurs is calculated.

The test results of Examples 1-19 and Comparative Examples 1-3 are shown in Table 2.

TABLE 1

| No. | Monomer solution (mass ratio) | Monomer | Lewis acid Type | Lewis acid Content | Inorganic filler (added amount) | Gelling time | Gelling phenomenon, Modification layer phenomenon |
|---|---|---|---|---|---|---|---|
| Example 1 | LiFSI/FEC/EMC (15:30:55) | FEC | $AlCl_3$ | 3% | / | 50 min | Mild curing, colorless and transparent layer |
| Example 2 | LiFSI/FEC/EMC (15:30:55) | FEC | $AlCl_3$ | 1% | / | 150 min | Mild curing, colorless and transparent layer |
| Example 3 | LiFSI/FEC/EMC (15:30:55) | FEC | $AlCl_3$ | 5% | / | 30 min | Mild curing, light yellow layer |
| Example 4 | LiFSI/FEC/EMC (15:30:55) | FEC | $AlCl_3$ | 8% | / | 15 min | Obvious heat release, brown layer |
| Example 5 | LiFSI/FEC/EMC (15:30:55) | FEC | $AlCl_3$ | 3% | / | 50 min | Mild curing, colorless and transparent layer |
| Example 6 | LiFSI/FEC/EMC (15:30:55) | FEC | $AlCl_3$ | 3% | / | 50 min | Mild curing, colorless and transparent layer |
| Example 7 | LiFSI/FEC/EMC (15:30:55) | FEC | $AlCl_3$ | 3% | / | 50 min | Mild curing, colorless and transparent layer |
| Example 8 | LiFSI/FEC/EMC (15:10:75) | FEC | $AlCl_3$ | 3% | / | 50 h | Mild curing, colorless and transparent flocculent layer |

TABLE 1-continued

| No. | Monomer solution (mass ratio) | Monomer | Lewis acid Type | Lewis acid Content | Inorganic filler (added amount) | Gelling time | Gelling phenomenon, Modification layer phenomenon |
|---|---|---|---|---|---|---|---|
| Example 9 | LiFSI/FEC/EMC (15:20:65) | FEC | AlCl$_3$ | 3% | / | 20 h | Mild curing, colorless and transparent layer |
| Example 10 | LiFSI/FEC/EMC (15:50:35) | FEC | AlCl$_3$ | 3% | / | 20 min | Obvious heat release, brown layer |
| Example 11 | LiFSI/FEC (15:85) | FEC | AlCl$_3$ | 3% | / | 11 min | Intense heat release, brown layer |
| Example 12 | LiFSI/FEC/EMC (10:30:60) | FEC | AlCl$_3$ | 3% | / | 100 min | Mild curing, colorless and transparent layer |
| Example 13 | LiFSI/FEC/EMC (50:30:20) | FEC | AlCl$_3$ | 3% | / | 30 min | Mild curing, colorless and transparent layer |
| Example 14 | FEC | FEC | AlCl$_3$ | 3% | / | 8 min | Intense heat release, black layer |
| Example 15 | LiFSI/EC/EMC (15:30:55) | EC | AlCl$_3$ | 3% | / | 40 h | Mild curing, colorless and transparent layer |
| Example 16 | LiFSI/FEC/EC/EMC (15:10:20:55) | FEC/EC | AlCl$_3$ | 3% | / | 30 h | Mild curing, colorless and transparent layer |
| Example 17 | LiFSI/FEC/EMC (15:30:55) | FEC | AlCl$_3$ | 3% | Al$_2$O$_3$ (3%) | 50 min | Mild curing, colorless and transparent layer |
| Example 18 | LiFSI/FEC/EMC (15:30:55) | FEC | Al(FSI)$_3$ | 3% | / | 40 min | Mild curing, colorless and transparent layer |
| Example 19 | LiFSI/FEC/EMC (15:30:55) | FEC | ZnCl$_2$ | 3% | / | 60 min | Mild curing, colorless and transparent layer |
| Comparative Example 1 | / | / | / | / | / | / | / |
| Comparative Example 2 | LiFSI/FEC/EMC (15:30:55) | FEC | AlCl$_3$ | 0 | / | / | No gelling |
| Comparative Example 3 | LiFSI/EMC (15:85) | / | AlCl$_3$ | 3% | / | 0 | No gelling |

TABLE 2

| No. | Lithium metal negative electrode Thickness of modification layer | Compression modulus of modification layer [MPa] | Solid electrolyte battery Short circuit rate [%] | Solid electrolyte battery First-cycle specific discharge capacity [mAh/g] | Solid electrolyte battery First-cycle coulombic efficiency [%] | Solid electrolyte battery Capacity retention rate after 200 cycles [%] |
|---|---|---|---|---|---|---|
| Example 1 | 3 μm | 0.71 | 4 | 134.2 | 81.7 | 82 |
| Example 2 | 3 μm | 0.42 | 11 | 128.2 | 80.4 | 75 |
| Example 3 | 3 μm | 0.57 | 3 | 133.1 | 82.8 | 82 |
| Example 4 | 3 μm | 0.25 | 26 | 112.3 | 63.2 | 45 |
| Example 5 | 500 nm | 0.71 | 18 | 135.2 | 83.6 | 67 |
| Example 6 | 1 μm | 0.71 | 6 | 133.8 | 81.8 | 78 |
| Example 7 | 10 μm | 0.71 | 3 | 124.7 | 80.3 | 81 |
| Example 8 | 3 μm | 0.02 | 32 | 115.2 | 65.8 | 53 |
| Example 9 | 3 μm | 0.11 | 24 | 118.6 | 71.2 | 61 |
| Example 10 | 3 μm | 0.31 | 14 | 127.8 | 74.8 | 78 |
| Example 11 | 3 μm | 0.08 | 35 | 108.2 | 60.4 | 32 |

TABLE 2-continued

| No. | Lithium metal negative electrode Thickness of modification layer | Compression modulus of modification layer [MPa] | Solid electrolyte battery | | | |
|---|---|---|---|---|---|---|
| | | | Short circuit rate [%] | First-cycle specific discharge capacity [mAh/g] | First-cycle coulombic efficiency [%] | Capacity retention rate after 200 cycles [%] |
| Example 12 | 3 μm | 0.62 | 12 | 124.2 | 80.5 | 75 |
| Example 13 | 3 μm | 0.78 | 9 | 126.3 | 81.2 | 77 |
| Example 14 | 3 μm | 0.05 | 33 | 97.2 | 45.2 | 41 |
| Example 15 | 3 μm | 0.58 | 8 | 130.4 | 81.6 | 80 |
| Example 16 | 3 μm | 0.62 | 7 | 131.8 | 81.9 | 81 |
| Example 17 | 3 μm | 0.75 | 4 | 133.6 | 83.7 | 85 |
| Example 18 | 3 μm | 0.73 | 3 | 135.7 | 84.1 | 86 |
| Example 19 | 3 μm | 0.72 | 4 | 134.3 | 83.5 | 84 |
| Comparative Example 1 | 0 | 0 | 38 | 127 | 76.1 | 67 |
| Comparative Example 2 | 0 | 0 | 41 | 105.5 | 61.2 | 50 |
| Comparative Example 3 | 0 | 0 | 43 | 95.3 | 55.7 | 51 |

The results in Table 2 demonstrate once again that in the lithium metal negative electrode of the present application, by forming an ion-conducting polymer modification layer on the surface of the lithium-based metal layer under the catalysis of a Lewis acid, and the Lewis acid contains cations of a metal capable of forming an alloy-type active material with lithium, the risk of internal short circuit in the lithium metal battery using the lithium metal negative electrode can be effectively reduced, and the safety performance of battery can be improved. Further, by optimizing the preparation parameters or structural parameters of the polymer modification layer, the battery is allowed to have a higher cycling performance, first-cycle specific discharge capacity and first-cycle coulombic efficiency while improving the safety performance of the battery.

Comparative Examples 1 to 3 do not meet the requirements of the present application, and the risk of internal short circuit in the lithium metal battery is high, which reduces the safety performance of the battery, and is detrimental to the improvements in terms of the cycling performance, first-cycle specific discharge capacity and first-cycle coulombic efficiency of the battery.

Described above are merely specific embodiments of the present application, but the protection scope of the present application is not limited to thereto. Any modification, replacement, or other equivalent readily conceived by a skilled person in the art according to the disclosure of the present application shall fall within the protection scope of the present application. Therefore, the protection scope of the present application should be defined by the protection scope of the claims.

What is claimed is:

1. A lithium metal negative electrode, comprising:
a negative electrode current collector;
at least one lithium-based metal layer provided on at least one surface of the negative electrode current collector; and
an ion-conducting polymer modification layer, which is a layer of gel located on a surface of one of the at least one lithium-based metal layer and comprises at least a catalytic amount of a Lewis acid, the Lewis acid containing cations of a metal capable of forming an alloy-type active material with lithium,
wherein the ion-conducting polymer modification layer has a compressive modulus of elasticity of 0.01 MPa to 1 MPa.

2. The lithium metal negative electrode according to claim 1, wherein the ion-conducting polymer modification layer has a thickness of 100 nm to 10 um.

3. The lithium metal negative electrode according to claim 1, wherein the Lewis acid is selected from one or more of the compounds represented by formula (1):

$$A_nL_m \qquad (1)$$

in which A represents cations of Al, Zn, Mg, Pb, Ge, Sn or Sb;
L independently represents F⁻, Cl, Br, I or an anion represented by formula (2),

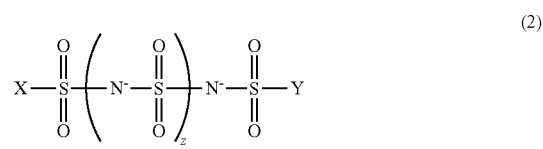

in which each X and Y independently represent F, Cl, Br, or I, an alkyl having 1 to 4 carbon atoms, or a haloalkyl having 1 to 4 carbon atoms,
z is 0, 1, 2, 3 or 4; and
n and m satisfy: the valence of A×n=the valence of L×m.

4. The lithium metal negative electrode according to claim 3, wherein L represents F⁻, Cl⁻, Br, I, [(FSO₂) ₂N]⁻, [(CF₃SO₂) ₂N]⁻, [(FSO₂) (CF₃SO₂) N]⁻, [(FSO₂) (C₂F₅SO₂) N]⁻,or [(FSO₂) (C₄F₉SO₂) N]⁻.

5. The lithium metal negative electrode according to claim 1, wherein the Lewis acid is selected from one or more of AlCl₃, ZnCl₂, Al [(FSO₂) ₂N]₃ and Zn [(FSO₂) ₂N]₂.

6. The lithium metal negative electrode according to claim 1, wherein the ion-conducting polymer modification layer comprises a polymer, which includes one or more of polyether, polyester and polyimine.

7. The lithium metal negative electrode according to claim 1, wherein the ion-conducting polymer modification layer further comprises a lithium salt, and a weight percentage of the lithium salt in the polymer modification layer is equal to or smaller than ₆₀%.

8. The lithium metal negative electrode according to claim 7, wherein the lithium salt includes one or more of $LiPF_6$, $LiBF_4$, $LiClO_4$, $LiAsF_6$, LiBOB, LIDFOB, LITFOP, $LiN(SO_2RF)_2$ and $LiN(SO_2F)(SO_2RF)$, in which RF represents $C_nF_{2n+1}$, and n is an integer from 0 to 10.

9. The lithium metal negative electrode according to claim 1, wherein the ion-conducting polymer modification layer further comprises an inorganic filler, and a weight percentage of the inorganic filler in the ion-conducting polymer modification layer is equal to or smaller than 10%.

10. The lithium metal negative electrode according to claim 9, wherein the inorganic filler includes one or more of silicon dioxide ($SiO_2$), titanium oxide ($TiO_2$), aluminum oxide (Al2O3), magnesium oxide (MgO), zirconium oxide ($ZrO_2$), zinc oxide (ZnO), iron oxide ($Fe_3O_4$), barium titanate ($BaTiO_3$), lead titanate ($PbTiO_3$), lithium nitride (LisN), lithium aluminate ($LiAlO_2$), montmorillonite and molecular sieve; and/or the inorganic filler has a volume-average particle size $D_v50$ of 50 nm to 1000 nm.

11. A method for preparing the lithium metal negative electrode according to claim 1, comprising the steps of:

providing a lithium metal negative electrode to be modified comprising the negative electrode current collector and the lithium-based metal layer provided on at least one surface of the negative electrode current collector;

providing a mixed solution comprising the Lewis acid and a monomer, wherein the Lewis acid contains the cations of the metal capable of forming the alloy-type active material with lithium; and covering a surface of the lithium-based metal layer with the mixed solution, such that the ion-conducting polymer modification layer is formed by means of polymerization of the monomer under the catalysis of the Lewis acid, so as to obtain the lithium metal negative electrode.

12. The preparation method according to claim 11, wherein the parts by weight of the Lewis acid is 1 to 35 based on 100 parts by weight of the monomer.

13. The preparation method according to claim 11, wherein the mixed solution further comprises a reaction moderator, and the parts by weight of the reaction moderator is greater than 0 and less than or equal to 800 based on 100 parts by weight of the monomer.

14. The preparation method according to claim 13, wherein the reaction moderator includes one or more of dimethyl carbonate, diethyl carbonate, dipropyl carbonate, ethyl methyl carbonate, methyl formate, ethyl formate, ethyl propionate, propyl propionate, methyl butyrate, ethyl acetate, N-methylpyrrolidone, N-methylformamide, N-methylacetamide, acetonitrile, sulfolane, dimethyl sulfoxide, methyl sulfide, diethyl sulfite, dimethyl sulfite, tetrahydrofuran, and cyclic ester as represented by formula (I);

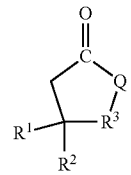

(I)

in which Q represents O or S, $R^1$ and $R^2$ independently represent H, F, or a fluoroalkyl having 1 to 4 carbon atoms, and $R^3$ represents a fluoroalkylene having 1 to 3 carbon atoms.

15. The preparation method according to claim 11, wherein the mixed solution further comprises a lithium salt, and the content of the lithium salt is 200 parts by weight or less based on 100 parts by weight of the monomer; and/or the mixed solution further comprises an inorganic filler, and the content of the inorganic filler is 30 parts by weight or less based on 100 parts by weight of the monomer.

16. A lithium metal battery, comprising a positive electrode plate and a negative electrode plate, wherein the negative electrode plate is a lithium metal negative electrode according to claim 1.

17. The lithium metal battery according to claim 16, wherein the positive electrode plate comprises a positive electrode current collector and a positive electrode film layer which is provided on at least one surface of the positive electrode current collector and comprises a positive electrode active material, and the positive electrode active material comprises one or more of lithium-containing phosphates with an olivine structure, lithium transition metal oxides and respective modified compounds thereof.

18. The lithium metal battery according to claim 16, wherein the lithium metal battery further comprises a solid electrolyte membrane provided between the negative electrode plate and the positive electrode plate.

19. A device, comprising the lithium metal battery according to claim 16.

20. The preparation method according to claim 11, wherein the monomer includes one or more of cyclic carbonate, cyclic sulfonate, cyclic sulfate, cyclic sulfite and halogenated derivatives thereof.

21. The preparation method according to claim 11, wherein the monomer includes one or more of ethylene carbonate, propylene carbonate and halogenated derivatives thereof.

* * * * *